(12) United States Patent
Armitage

(10) Patent No.: US 9,135,314 B2
(45) Date of Patent: Sep. 15, 2015

(54) SYSTEM AND METHOD FOR IMPROVED CONSUMPTION MODELS FOR SUMMARY ANALYTICS

(71) Applicant: SAP AG, Walldorf (DE)

(72) Inventor: John Armitage, Palo Alto, CA (US)

(73) Assignee: SAP SE, Walldorf (DE)

( * ) Notice: Subject to any disclaimer, the term of this patent is extended or adjusted under 35 U.S.C. 154(b) by 160 days.

(21) Appl. No.: 13/623,241

(22) Filed: Sep. 20, 2012

(65) Prior Publication Data

US 2014/0082025 A1 Mar. 20, 2014

(51) Int. Cl.
G06F 17/00 (2006.01)
G06F 17/30 (2006.01)
G06Q 10/06 (2012.01)

(52) U.S. Cl.
CPC .... *G06F 17/30554* (2013.01); *G06F 17/30592* (2013.01); *G06Q 10/063* (2013.01)

(58) Field of Classification Search
CPC ............ G06F 17/30592; G06F 17/243; G06F 17/30554
USPC .................. 707/603, 804, E17.044
See application file for complete search history.

(56) References Cited

U.S. PATENT DOCUMENTS

| | | | |
|---|---|---|---|
| 6,611,839 B1 | 8/2003 | Nwabueze | |
| 7,873,670 B2* | 1/2011 | Statchuk | 707/796 |
| 8,731,972 B1* | 5/2014 | Wolf et al. | 705/4 |
| 8,751,408 B2* | 6/2014 | Linton et al. | 705/328 |
| 2002/0190980 A1* | 12/2002 | Gerritsen et al. | 345/419 |
| 2004/0153822 A1* | 8/2004 | Arcand et al. | 714/38 |
| 2004/0243593 A1 | 12/2004 | Stolte et al. | |
| 2004/0243616 A1 | 12/2004 | Benhase et al. | |
| 2006/0048053 A1* | 3/2006 | Sembower et al. | 715/517 |
| 2007/0055691 A1* | 3/2007 | Statchuk | 707/102 |
| 2007/0266042 A1* | 11/2007 | Hsu et al. | 707/102 |
| 2009/0024660 A1 | 1/2009 | Borgsmidt et al. | |
| 2009/0049372 A1 | 2/2009 | Goldberg | |
| 2009/0307054 A1* | 12/2009 | D'Imporzano et al. | 705/10 |
| 2011/0131173 A1* | 6/2011 | Fernandez Ortega | 707/602 |

(Continued)

FOREIGN PATENT DOCUMENTS

WO 2006/127859 A2 11/2006

OTHER PUBLICATIONS

Ladjel Bellatreche, et al.; A Personalization Framework for OLAP Queries; Nov. 4, 2005; Bremen, Germany; 10 pages.

(Continued)

*Primary Examiner* — Phong Nguyen
(74) *Attorney, Agent, or Firm* — Fountainhead Law Group PC (57) ABSTRACT

Systems and methods for retrieving, analyzing, and displaying summary analytics within a structured user interface framework are disclosed. The structured user interface can include an analysis digests section that includes and organizes individual discrete summary analytics in the form of analysis digests. Each analysis digests includes graphical and or alphanumeric visual representations of discrete analysis results according to analysis digest specifications associated with a particular user. An analysis digest section can include analysis digests selected by and/or associated with a particular user and/or analysis digests associated with a user associated with the particular user. Thus, through social networks, users may create and share analysis digests from within the structured user interface framework.

24 Claims, 9 Drawing Sheets

(56) References Cited

U.S. PATENT DOCUMENTS

| | | | |
|---|---|---|---|
| 2011/0208690 A1* | 8/2011 | Cushing et al. | 707/602 |
| 2012/0013539 A1 | 1/2012 | Hogan et al. | |
| 2012/0216104 A1* | 8/2012 | Bae | 715/212 |
| 2013/0041923 A1* | 2/2013 | Sappinen | 707/792 |
| 2013/0151431 A1* | 6/2013 | Linton et al. | 705/328 |
| 2014/0082540 A1 | 3/2014 | Armitage | |

OTHER PUBLICATIONS

Irene Garrigos, et al.; A Conceptual Modeling Approach for OLAP Personalization; Lucentia Research Group, University of Alicante, Spain; 2009; 14 pages.

Houssem Jerbi, et al.; Management of Context-Aware Preferences in Multidimensional Databases; IRIT; Toulouse, France; 2008; 8 pages.

Extended European Search Report from European Patent Application No. 13004543.8, mailed on Jan. 9, 2014; 8 pages.

* cited by examiner

SYSTEM AND METHOD FOR IMPROVED CONSUMPTION MODELS FOR SUMMARY ANALYTICS

CROSS REFERENCE TO RELATED APPLICATIONS

This application is related to application Ser. No. 13/622,274 filed concurrently with the present application.

BACKGROUND

The present invention relates to techniques for collecting, organizing, analyzing, and displaying information from hierarchical multidimensional data sets, and in particular, to systems and methods for improved consumption models for summary analytics.

Unless otherwise indicated herein, the approaches described in this section are not prior art to the claims in this application and are not admitted to be prior art by inclusion in this section.

In business, analysis of past, present, and future performance is a critical task. A multitude of business-data collection, mining, and analysis products exists for the complex task of evaluating a business's performance, planning for future operations, setting targets, and projecting possible scenarios, conditions, and outcomes. Such products usually involve data stores, such as databases, and the combination of hardware and software for accessing, querying, updating, and analyzing various types of business data stored in the data stores.

For example, businesses, and indeed whole industries, exist around providing enterprise resource planning (ERP) applications to businesses of all sizes. Such ERP applications come in a variety of styles and structures, and can include various types and numbers of constituents applications. Each constituent application can be designed to implements a specific type of analysis geared towards assisting one or more aspects of a business organization. As an example, an ERP application can include both the general ledger accounting program as well as a sales and operations planning (S&OP) program to collect, analyze, plan, and project financials, sales, operations of a particular business.

While such highly complex and comprehensive applications, such as an ERP application, exist, the manner in which the information contained in such applications is presented to a user varies greatly. To simplify the consumption of such information, various forms of alphanumeric and graphical analytics displayed in a "dashboard" or home screen have been developed. Analytical applications generate complex bar graphs, pie charts, bullet charts, line graphs, line graphs, and many other types of graphic and hybrid alphanumeric-graphic visual representation of the data have been devised to quickly and concisely convey the analytic information to a user. While each type of visual representation has its associated advantages and strengths for showing various aspects of the analytics, devising the most efficient way to quickly view and consume such data and implement it in a computer generated visual representation of the analytic remains a specialized skill. Most business users, save for some technically trained analyst, are not skilled in the techniques of devising meaningful analytics and concise metrics from vast amounts of data and the generating a visual representation of such summary analytics and metrics for quick and easy comprehension. The tasks of devising metrics and devising visual representations is further complicated by the task of inserting the generated visual representations into a easily navigable dashboard or monitoring and light analysis user interface.

For instance, a user may know what information they would like to see, however, they may lack the programming expertise to construct the appropriate computer executable code, let alone the design expertise to organize the numerical results into an efficient visual representation. To lessen the burden of quickly producing easily understood business analysis on business users, many products exist that provide users with prepackaged analysis with predefined visual representations. Such solutions, however, do not allow users to easily customize analysis views or view analysis or metrics and the resulting visual representations constructed by other users.

Thus, there is a need for improved systems and methods for generation and consumption models for summary analytics. The present invention solves these and other problems by providing systems and methods that provide a structured framework for generating and displaying discrete analysis digest comprising graphical and alphanumeric information according to a predetermined analysis digest specification.

SUMMARY

Embodiments of the present invention improve generation and consumption models of summary analytics. Various embodiments of the present invention are directed toward a method in a computer system that includes loading a multidimensional data set, retrieving an analysis digest specification associated with a particular user. The analysis digest specification can include a plurality of specifications for discrete analysis digests, each of the plurality of specifications can include definitions for a particular analysis results and a visual representation based on the particular analysis results. Such methods further include parsing the multidimensional data set according to the analysis digest specification to generate a first parsed multidimensional data set, and generating a first plurality of analysis digests in response to the first parsed multidimensional data set and the analysis digest specification. The definitions for the visual representation can include definitions for size and location and the definitions for the particular analysis results can include an association with an associated user.

In such embodiments, the method can also include retrieving an analysis digest specification associated with the associated user, parsing the multidimensional data set according to the analysis digest specification associated with the associated user to generate a second parsed multidimensional data set, and generating a second plurality of analysis digests in response to the second parsed multidimensional data set and the analysis digest specification associated with the associated user.

Other embodiments include loading the first plurality of analysis digests into a structured user interface according to the analysis digest specification.

Yet other embodiments can also include receiving a user input through a control embedded in a structured user interface and updating one or more of the analysis digest in response to the user input. Such methods can also include displaying the structured user interface on a computer display device of the computer system, wherein each of the first plurality of analysis digests include graphical or alphanumeric visual representations corresponding to at least one of the plurality of specifications.

Various other embodiments are directed towards systems that can include including an analytic engine, an analysis digest specification module coupled to the analytic engine, and a user profile module coupled to the analytic engine and the analysis digest module. In such systems, the analytic engine loads a multidimensional data set, retrieves an analysis digest specification associated with a particular user from the analysis digest specification module, wherein the analysis digest specification includes a plurality of specifications for discrete analysis digests, each of the plurality of specifications include definitions for a particular analysis results and a visual representation based on the particular analysis results, parsing, in the computer system, the multidimensional data set according to the analysis digest specification to generate a first parsed multidimensional data set. The analytic engine also generates a first plurality of analysis digests in response to the first parsed multidimensional data set and the analysis digest specification.

In such embodiments, the definitions for the visual representation can include definitions for size and location and the definitions for the particular analysis results can include an association with an associated user. The analytic engine also retrieves an analysis digest specification associated with the associated user, parses the multidimensional data set according to the analysis digest specification associated with the associated user to generate a second parsed multidimensional data set, and generates a second plurality of analysis digests in response to the second parsed multidimensional data set and the analysis digest specification associated with the associated user.

In yet other embodiments the analytic engine can also load the first plurality of analysis digests into a structured user interface according to the analysis digest specification.

In related embodiments, analytic engine can also receive a user input through a control embedded in a structured user interface and updates one or more of the analysis digest in response to the user input.

In yet other embodiments, the analytic engine further displays the structured user interface on a computer display device, wherein each of the first plurality of analysis digests can include graphical or alphanumeric visual representations corresponding to at least one of the plurality of specifications.

Some embodiments the present invention are directed towards non-transient computer readable media that include executable code that when executed by a processor of a computer system cause the processer to load a multidimensional data set into a memory of the computer system, retrieve an analysis digest specification associated with a particular user, wherein the analysis digest specification includes a plurality of specifications for discrete analysis digests, each of the plurality of specifications include definitions for a particular analysis results and a visual representation based on the particular analysis results, parse the multidimensional data set according to the analysis digest specification to generate a first parsed multidimensional data set, and generate a first plurality of analysis digests in response to the first parsed multidimensional data set and the analysis digest specification.

In other embodiments, the definitions for the particular analysis results can include an association with an associated user. In such embodiments, the non-transient computer readable media can further comprising executable code that causes the processor to retrieve an analysis digest specification associated with the associated user, parse the multidimensional data set according to the analysis digest specification associated with the associated user to generate a second parsed multidimensional data set, and generate a second plurality of analysis digests in response to the second parsed multidimensional data set and the analysis digest specification associated with the associated user.

In some embodiments, the executable code can further cause the processor to load the first plurality of analysis digests into a structured user interface according to the analysis digest specification.

In related embodiments, the executable code can also cause the processor to receive a user input through a control embedded in a structured user interface and updating one or more of the analysis digest in response to the user input.

In other embodiments, the executable code can causes the processor to display the structured user interface on a computer display device, wherein each of the first plurality of analysis digests include graphical or alphanumeric visual representations corresponding to at least one of the plurality of specifications.

The following detailed description and accompanying drawings provide a better understanding of the nature and advantages of the present invention.

DETAILED DESCRIPTION

Described herein are techniques for systems and methods for improved generation and consumption models for summary analytics. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments of the present invention are directed toward systems and methods for generating user interfaces that includes a meta-chart framework for organizing and analyzing multi-dimensional hierarchical data in an efficient and intuitive graphical user interface with which a user can view and create visual representations of particular summary analytics. Users can invoke controls in the user interface to define, generate, and display summary analytics from within the meta-chart framework in real time. Such embodiments can result in an organized analysis digest section within the user interface. The organize analysis digest section can include discrete and independent visual representations of summary analytics devised from information and displays the user interface. The analysis digest section of the user interface can allow for quick customization of various visual and content related attributes of each analysis digest. Each individual analysis digest can include a small-scale hybrid visual presentation, i.e. a graphical charts with embedded text or figures, embedded in a movable, size and dimension restricted tile. Each tile can be moved within the analysis digest section to customize the order in which the analysis digests are viewed. The individual analysis digest can be defined by each individual user or can be imported from an analysis digest section associated with the user. Such features are described in greater detail herein.

Figure 1:
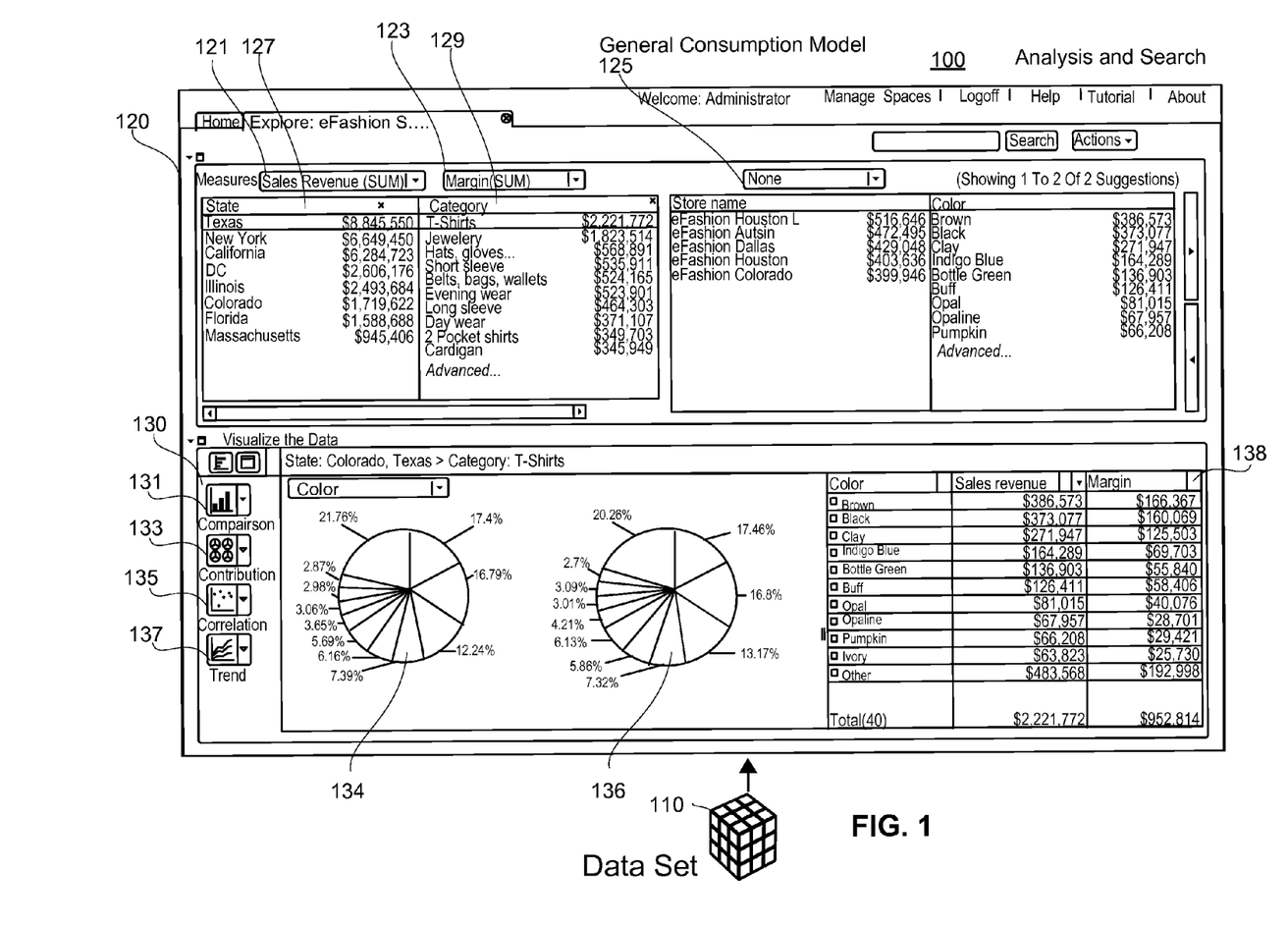
FIG. 1 illustrates a general consumption model for hierarchal multidimensional data.

Multidimensional data can be stored in a variety of file formats. The nature of the multidimensional data allows for exploration and analysis of the data based on any stored category or classification of data within the multidimensional data structure. For instance the data can be classified by region, country, cost center, product, customer, price, cost, etc. using the classifications of the data within the multidimensional data structure, various aspects of the data can be explored and analyzed using one of many types of applications. FIG. 1 shows a simplified schematic of a general consumption model 100 of multidimensional data set 110. The multidimensional data set 110, commonly referred to as a cube, can be loaded into an analysis and search tool as depicted by the analysis and search tool graphical user interface 120. Using the various controls of the graphical user interface 120, a user can explore various aspects of the data set.

As shown, the user has initiated a tab for exploring an aspect of the multidimensional data set 110. Within this tab, user can select the measures from pull-down menus 121, 123, and 125. In the scenario shown, sales revenue and margin (SUM) are selected. Just under the measures section, other selectable aspects of the data are shown in the windows 127 and 129 in list form. In the scenario shown in FIG. 1, window 127 shows a selection of states, i.e. Texas and Colorado. Window 129 shows a list of product categories. In the example shown, T-shirts are selected. The resulting analysis is then shown in the visualization of the data section 130. The type of chart shown in the visualization of the data can be selected and modified using menus 131, 133, 135, and 137. In the example shown, pie charts 134 and 136 are generated with data legend and additional detail shown in section 138.

Consumption models of multidimensional data, like the one shown in FIG. 1, are incredibly useful for users who know exactly what kind of information to look for and how best to view that information. Accordingly, tools like the one shown in FIG. 1 are best used by sophisticated analysts and technical users for designing dashboards and producing detailed reports. Unfortunately, consumption models that require intricate specifications and controls require significant training and experience in order to produce useful analysis and reports. Embodiments of the present disclosure are directed at devising and generating an intuitive and structured metachart framework multidimensional data for everyday monitoring in light analysis by business and non-technical users.

Figure 2A:
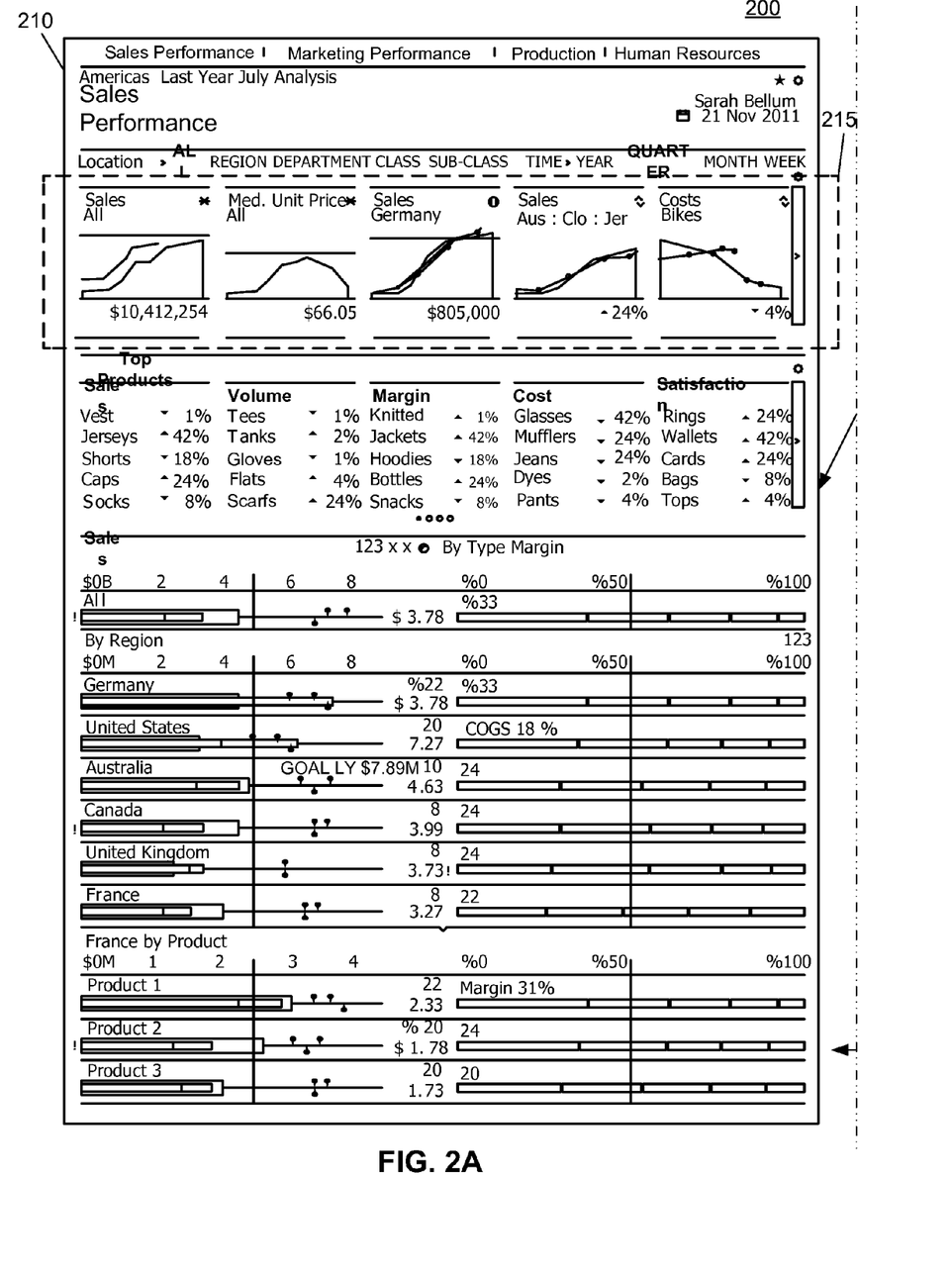
FIGS. 2A and 2B illustrates an improved general consumption models for hierarchal multidimensional data according to one embodiment of the present invention.
Figure 2B:
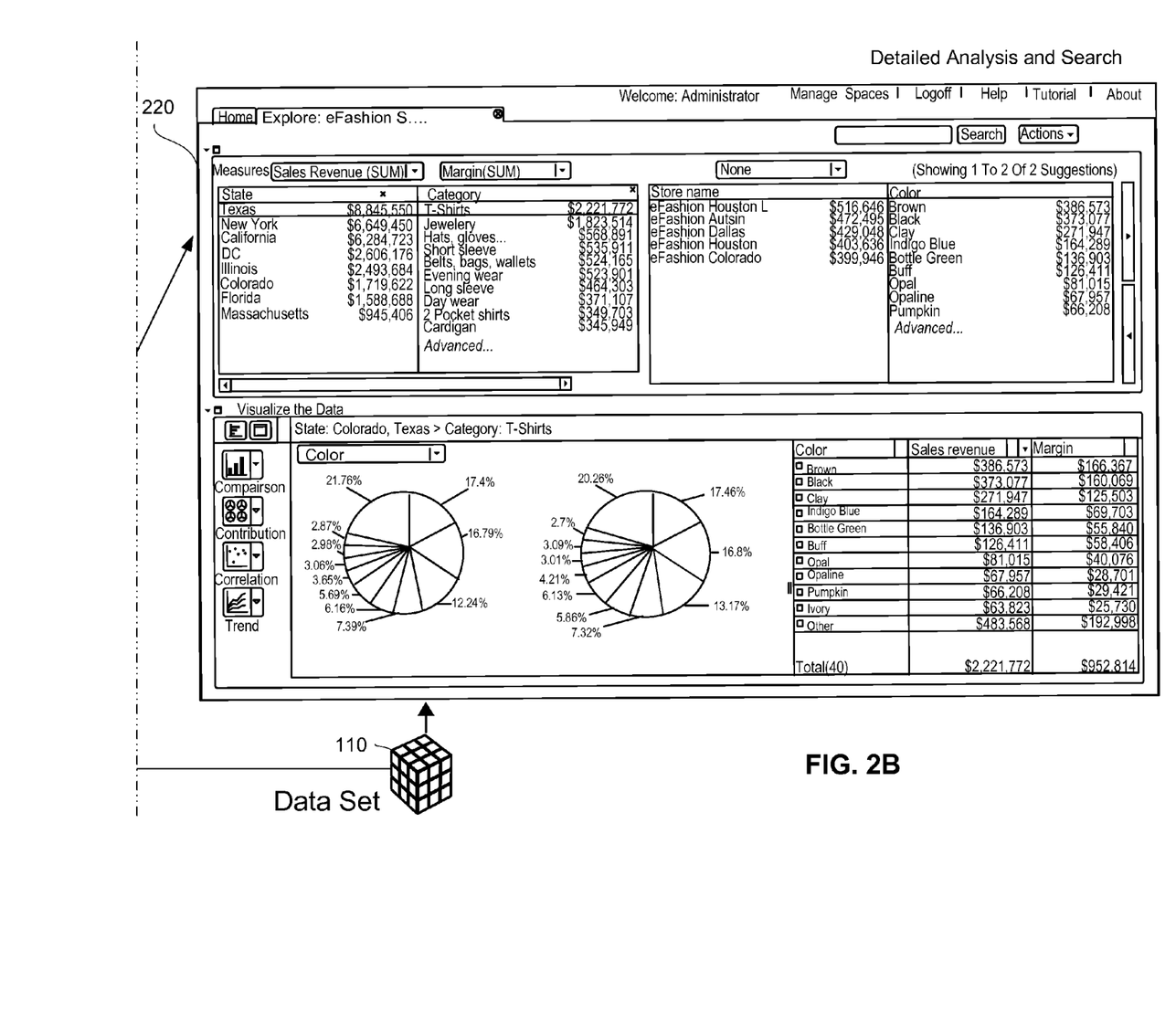

FIGS. 2A and 2B show scenario 200 according to various embodiments of the present invention. In such embodiments, a monitoring and light analysis graphical user interface 210 and a detailed analysis search graphical user interface 220 can both read data from the multidimensional data set 110. The monitoring and light analysis graphical user interface 210 can be included in various applications or be the product of a standalone application. In such embodiments, the monitoring and light analysis system, application, or application component, can load data from the multidimensional data set 110, perform predefined analysis and calculations, and present the results into the various sections of the monitoring and light analysis graphical user interface 210 as graphical and alphanumeric information. As used herein, the monitoring and light analysis graphical user interface 210 refers to both the structured display of data on a computer output display, such as a computer monitor, as well as the underlying system, application, or application component used to generate the structured display. The detailed analysis and search graphical user interface 220 includes analogous features and capabilities to the analysis and search graphical user interface and application discussed in reference to FIG. 1.

In some embodiments, the monitoring and light analysis interface 210 can communicate with and/or invoke the detailed analysis and search interface 220 in response to commands issued by a user in the monitoring and light analysis module 210. Based on the information displayed in the monitoring and light analysis interface 210, a user may click on contextual controls to activate a detailed analysis and search interface 220 in order to explore the multidimensional data set 110 in more detail or with a different sets of analytical parameters.

Accordingly, the detailed analysis and search interface 220 can be manipulated to alter or update the predetermined and structured display of the multidimensional data shown in the monitoring and light analysis interface 210. In other embodiments, the monitoring and light analysis interface 210 and the detailed analysis and search interface 220 can be coupled by a bidirectional connection such that each can invoke and/or update the other. In this way, the various components and areas of the monitoring and light analysis interface 210 can be customized to a particular user's interests, job functions, or analytical needs in real time without the need for complicated programming, or reliance on skilled information services personnel. For example, a series of individual or related digest or summary style visual representations of analytical data 215, that can include simplified graphical and alpha-numeric data, can be generated by monitoring and light analysis interface 210 and the detailed analysis and search interface 220 based on one or more analysis digest specifications. Such analysis digest specifications can include information including, but not limited to, an associated user, group of users, type of user, social media source addresses, followed social media users, links to external analytical data, links to internal analytical data, etc.

Figure 3:
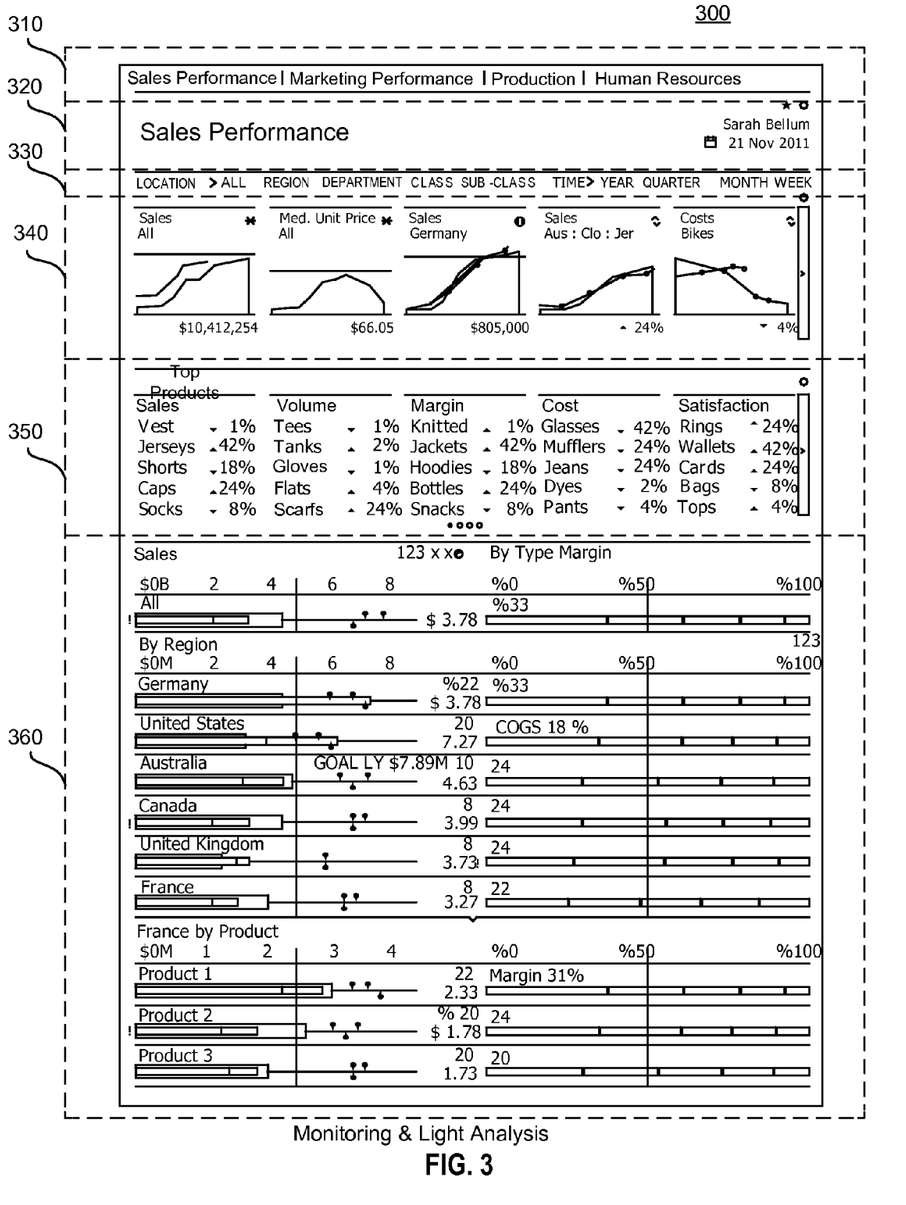
FIG. 3 illustrates a structured user interface for monitoring and light analysis of hierarchical multidimensional data according to one embodiment of the present invention.

FIG. 3 shows an exemplary depiction of a monitoring and light analysis interface 300 that can be used to implement and display various aspects of the present invention. As shown, monitoring and light analysis interface 300 can include a navigation section 310, a title section 320, a filter section 330, a digest section 340, a gallery section 350, and a lattice section 360. Various embodiment the present invention are directed towards systems and methods for displaying analytical data in the digest section 340.

Figure 4:
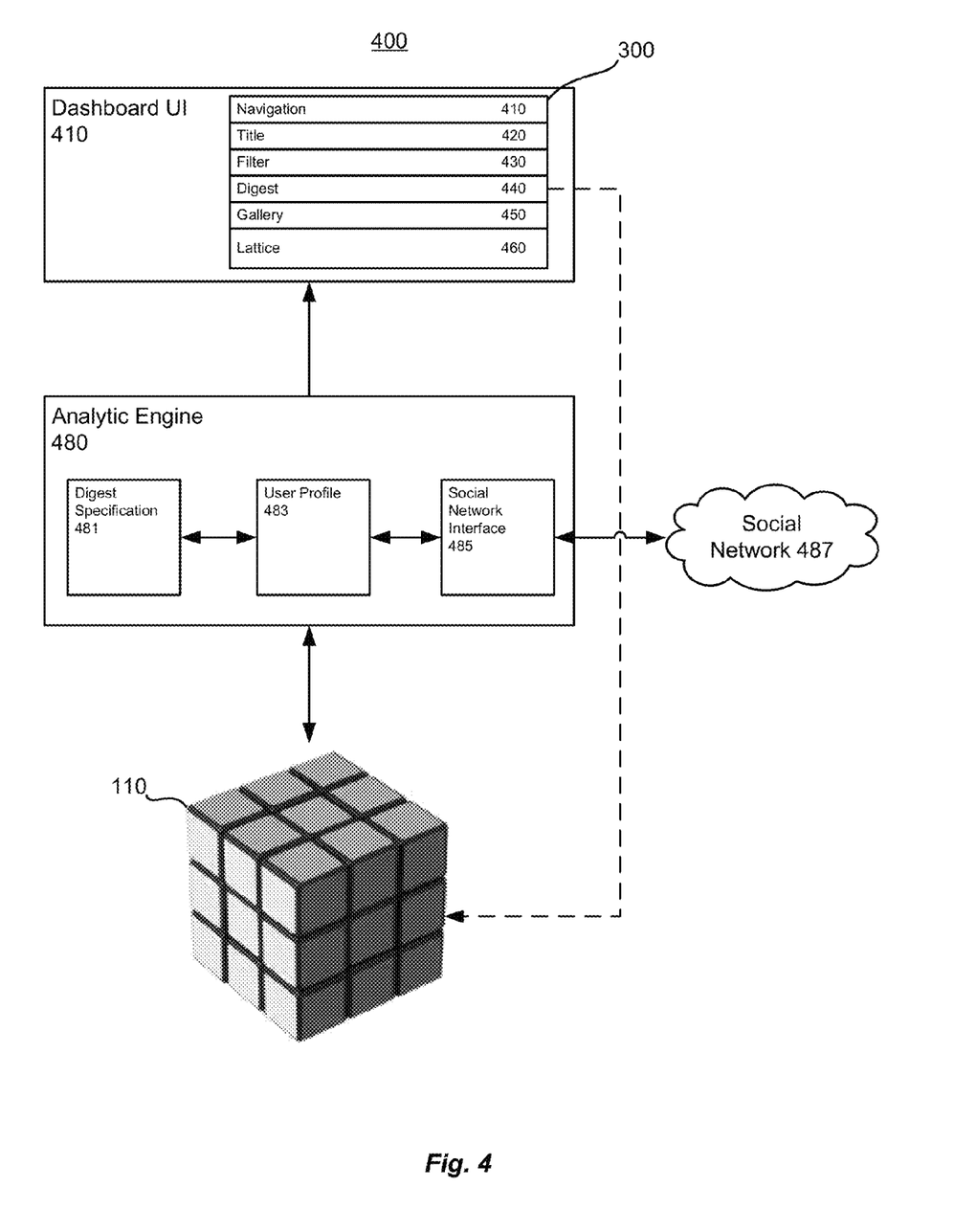
FIG. 4 illustrates a simplified system diagram for providing a structured framework with which to analyze and display hierarchical multidimensional data according to one embodiment of the present invention.

FIG. 4 shows a simplified schematic of a system 400 according to various embodiments of the present invention. Each of the components shown in FIG. 4 can be implemented by one or more computer systems having processors executing computer readable code. A monitoring and light analysis module 300 can be instantiated, embedded, or included in a dashboard user interface 410. As described above in reference to FIG. 3, monitoring and light analysis module 300 can include multiple components or sections. As shown, monitoring and light analysis module 300 can include a navigation section 410, a title section 420, a filter section 430, a digest section 440, a gallery section 450, and a lattice section 460. The dashboard user interface 410 can receive information, data, analytics, and other results from various calculations from the analytic engine 480.

Analytic engine 480 can include any number of intermediate or enterprise level applications, modules, or systems for viewing, manipulating, storing, or retrieving data from multidimensional data set 110. In some embodiments, the user interface 410 is generated by the analytic engine 480, while in other embodiments, dashboard user interface 410 is generated by a separate software application module. The structure of the monitoring and light analysis module 300 can be predetermined and based on a structure customized for a particular user, business unit, company, or for a particular purpose. The specifics of the predetermined structured of the monitoring and light analysis module 300, and the constituents components, can depend on default predetermined schemes saved in or accessible to digest specification module 481 and/or user profile module 483. The analytics engine 480 can receive user input to alter the saved versions of the predetermined schemes and user profiles stored in the digest specification module 481, user profile module 483, or social media network interface/module 485.

In some embodiments, the digest specification module 481 and/or user profile module 483 can be associated with one another to produce specific instances of the dashboard user interface 410 and/or monitoring and light analysis module 300. In embodiments of the present disclosure, the digest section 430 can include a structured framework for displaying summarized analysis of the multidimensional hierarchal data from the multidimensional data set 110 based on default predetermined schemes saved in or accessible to digest specification module 481 and/or user profile module 483 in individual analysis digest frames of a fixed size within a scrollable digest section, like one shown in FIGS. 3 and 4. The individual analysis digests provide a user with quick and specialized views of discrete portions of analysis that are of particular interest to a user on a regular basis. For instance, the user may wish to see what the trend of stock price in a dashboard displayed all day while sitting at his computer terminal, or a user may be interested in checking sales figures in view of a projected goal each time a monitoring and light analysis application is opened.

In other embodiments, a user profile stored in the user profile module 483 can be associated with a user profile stored in the social network interface 485 to check for associations with other users. If a particular user is associated with another user found in the social network interface 485, then the analytic engine 480 or the user profile module 483 can check a specific digest specification associated with the user stored in digest specification module 481 for any possible analysis digest specifications associated with the associated user that should be included in any generated analysis digest section. Accordingly, one user associated with another user via social network 487, can use analysis digests specifications generated or created by the associated user, to display analysis digests in the user's own analysis digest section. Such embodiments are particularly useful in scenarios where a manager of a group has determined that a particular analysis digest should or would be of particular interest to the rest of his group. The members of the manager's group can then subscribe to the manager's analysis digest feed or associate with him in the social network 487 to have one or more analysis specifications associated with the manager included in their own analysis digest specification used to generate their individual analysis digest sections. In some embodiments, each user can choose to specify that their own analysis digest section mimics, in whole or in part, another associated users analysis digest section.

Figure 5:
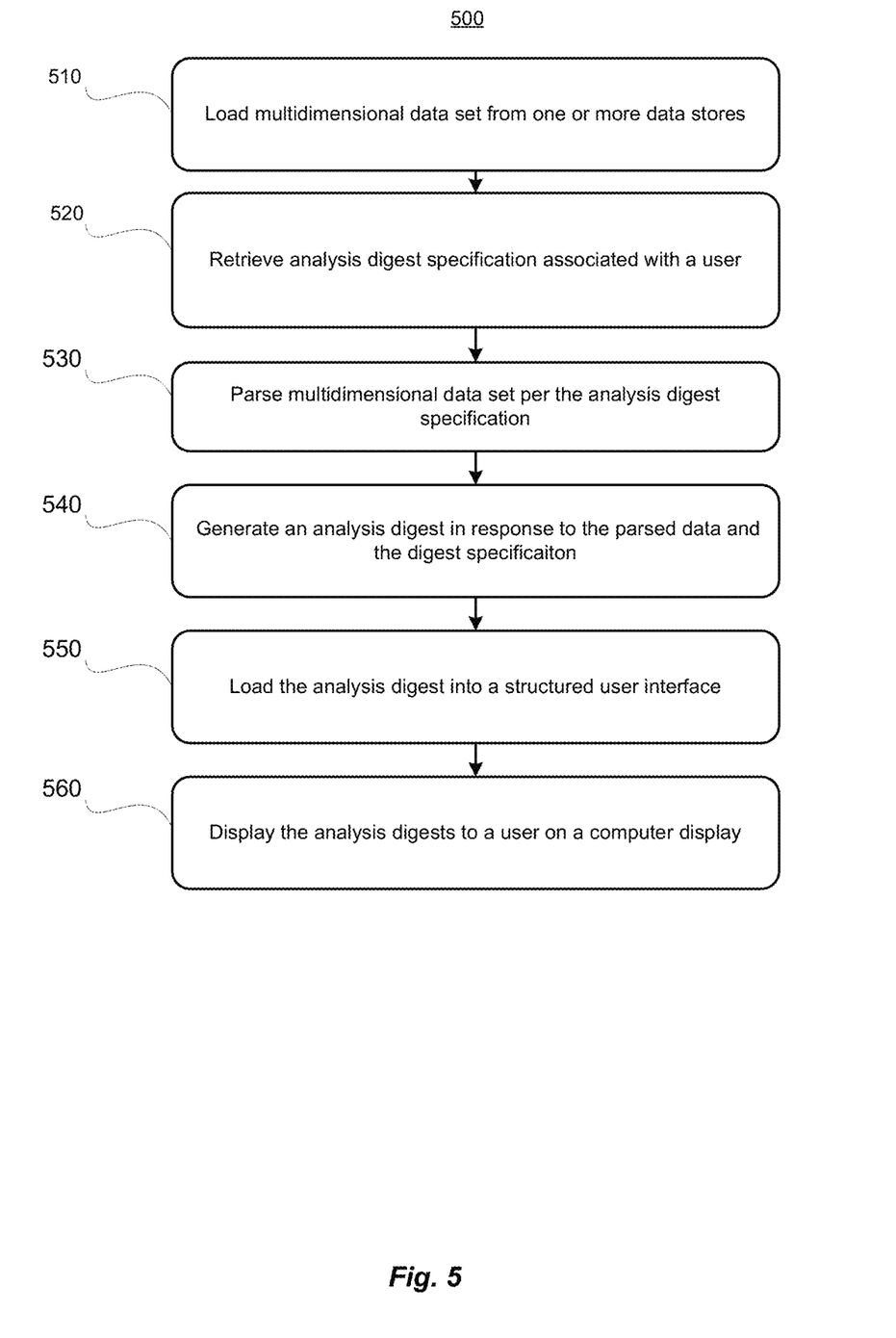
FIG. 5 illustrates a method for analyzing and displaying hierarchical multidimensional data according to one embodiment of the present invention.

FIG. 5 shows a flowchart of a method 500 for determining, generating, and displaying discrete individual analysis digests based on hierarchical multidimensional data sets. The method begins at step 510 in which analytic engine loads a multidimensional data set from one or more data stores, according to information contained in an analysis digest specification module, a user profile module, or other elements of the analytic engine that store settings and configurations. In such embodiments, each module or component of the analytic engine can be embodied by a combination of hardware and software. For example, each module of the analytic engine can be run as an instance of a particular set executable code. In such embodiments, each module or component of the analytic engine can be run on a single computer system, or can be run on multiple computer systems, such as in a cloud computing configuration.

In step 520, the analytic engine can retrieve one or more analysis digests specifications associated with a particular user or group of users. In some embodiments, the analysis digest specification module can supply the analysis digest specifications. In other embodiments, the analysis digest specifications can be stored in a local or remote data store. The user associate with particular analysis digest specifications can be identified by a user identifier and/or password. The user profile module can identify a user by an associated user identification and/or password and provide such information to the digest specification module or other data store to verify authorization, access, and or association of a particular user with a particular analysis digest specification or set of analysis digest specifications.

In step 530, the analytic engine can parse the multidimensional data according to specifications contained in the analysis digest specification. For example, the analysis digest specifications might specify three distinct fixed-dimension visual representations of a particular predetermined analytic. In such scenarios, the analytic engine can process the parsed multidimensional data to generate analysis results according to the analysis digest specifications. The analysis results can then be used to generate visual representations according to a predetermined scheme. The predetermined scheme can include information regarding the restrictions on size, placement, color schemes, alphanumeric text size, graph and chart types and sizes, etc. In step 540, the analytic engine can load the visual representations into one or more analysis digests frameworks according to the analysis digest specification and/or user preferences available in the user profile module.

In step 550, the analytic engine can load the analysis digest into one or more graphical user interfaces, according to the predetermined the analysis digest specifications. A graphical user interfaces can then be displayed to one or more users on one or more computer output devices, such as computer monitors, television screens, tablet computers, PDAs, smart phones, etc.

In some embodiments, the analytic engine can receive user input from the graphical user interface to update, create, move, delete, edit, or otherwise change any or all of the analysis digests displayed in the analysis digest section of the graphical user interface. For example, a user may drag and drop individual analysis digests to change the order that they appear in the structured analysis digest section or framework. Similarly, the user may invoke various types of controls displayed in the graphical user interface to add summary analytics newly developed from other portions of the graphical user interface to the digest section as a new analysis digest. The analytic engine can also receive user input from a user through controls in the scrollable digest section or framework to augment, delete, or shuffle analysis digests already displayed.

In related embodiments, any changes made to individual analysis digests or the analysis digest section or framework, can be noted by the analytic engine and saved to the analysis digest module, the user profile module, or other data store. Accordingly, a user can make changes to the predetermined layout and content of a particular implementation of an analysis digest section or individual analysis digest. The changes to the predetermined layout and content of an analysis digests associated with particular user will then be presented to the user as the predetermined analysis digest layout the next time the user invokes a program or logs into the analytic engine system.

Figure 6:
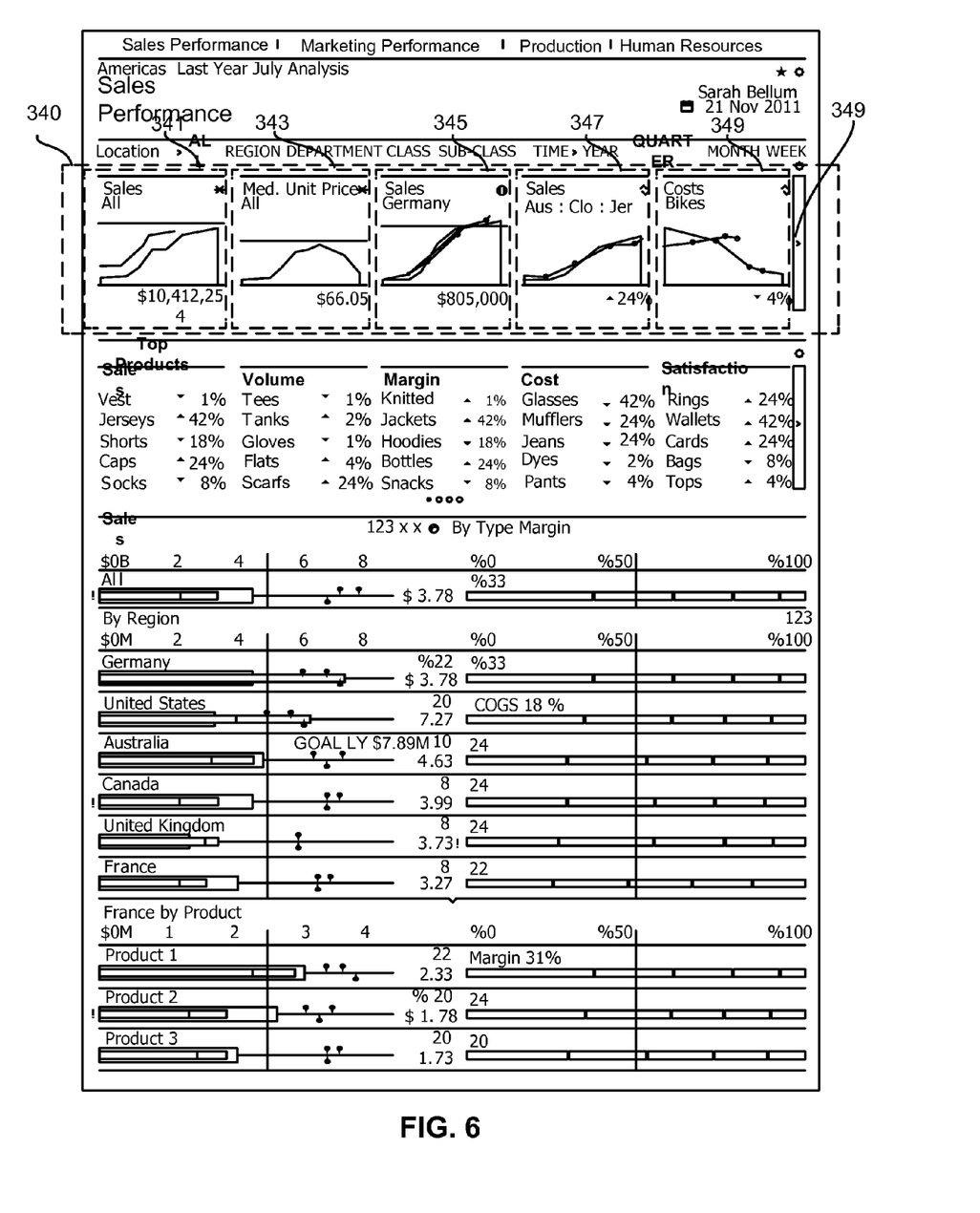
FIG. 6 illustrates an analysis digest section embedded in a structured framework of a graphical user interface according to various embodiments the present mention.

FIG. 6 depicts a structured framework in which an analysis digest section 340 can be generated and displayed to one or more users according to various embodiments the present invention. As shown, structured analysis digest section or framework 340 can include multiple individual analysis digests depicting discrete visual representations of various types of analysis results generated by one or more analytic engines. In the example shown, analysis digest section or framework 340 can include analysis digests 341, 343, 345, 347, and 349. The content, size, format, position, update rate or period, color scheme, error codes, alerts, metadata, of each of the analysis digests 341, 343, 345, 347, and 349 can be specified in a analysis digest specification associated with particular user who invoked the analysis digest section are framework 340. In some embodiments, the analysis digest specification can be generic for all users, i.e. a default analysis digest specification. In related embodiments, the default analysis digest specification can be edited by any user to customize the content, position and order of the individual analysis digests displayed in the analysis section 340. In such embodiments, the analysis digest specification can be customized to a particular user through controls displayed in the analysis digest section 340, or elsewhere in a graphical user interface in which the analysis digest section 340 is included.

In other embodiments, analysis digests in addition to analysis digests 341, 343, 345, 347, and 349 shown can be included in the analysis digest section 340. For example, a user may operate control 349 to scroll through, i.e. shift, the lineup of an analysis digests to the left and right to scroll through all of the analysis digests included in the analysis digest section 340.

Figure 7:
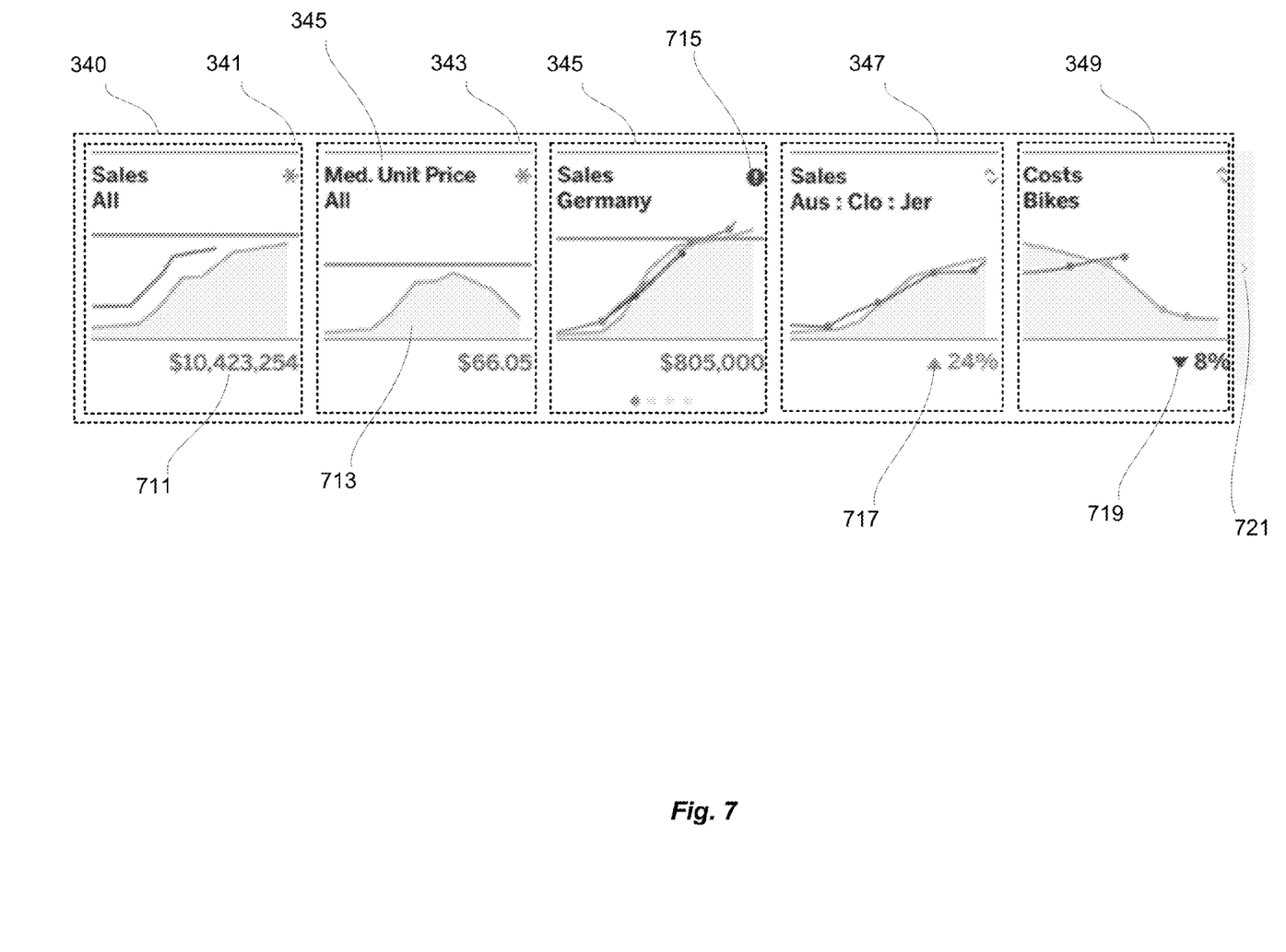
FIG. 7 illustrates an analysis digest section that includes multiple discrete analysis digests according to various embodiments of the present invention.

FIG. 7 depicts another view of a analysis digest section 340 according to various embodiments of the present invention. As shown, each digest can include a combination of alphanumeric and graphical visual representations of the particular analysis results provided by the analytic engine. Analysis digest 341, for example, includes a total dollar amount for the analysis digest titled "Sales All." Similarly, analysis digest 343 includes a title 345 and a graph 713. Analysis digest 345 can include not only the alphanumeric text and graph, but also an alert indicator 715 indicating an error, threshold condition, or other condition to which a user may wish to be alerted. Analysis digest 347 can include a color-coded or shaded change indicator 717 indicating an increase in a particular value or analytic depicted in the analysis digest 340. Similarly, analysis digest 349 can include a color-coded or shaded change indicator indicating a decrease in a particular value or analytic depicted in the analysis digest.

Figure 8:
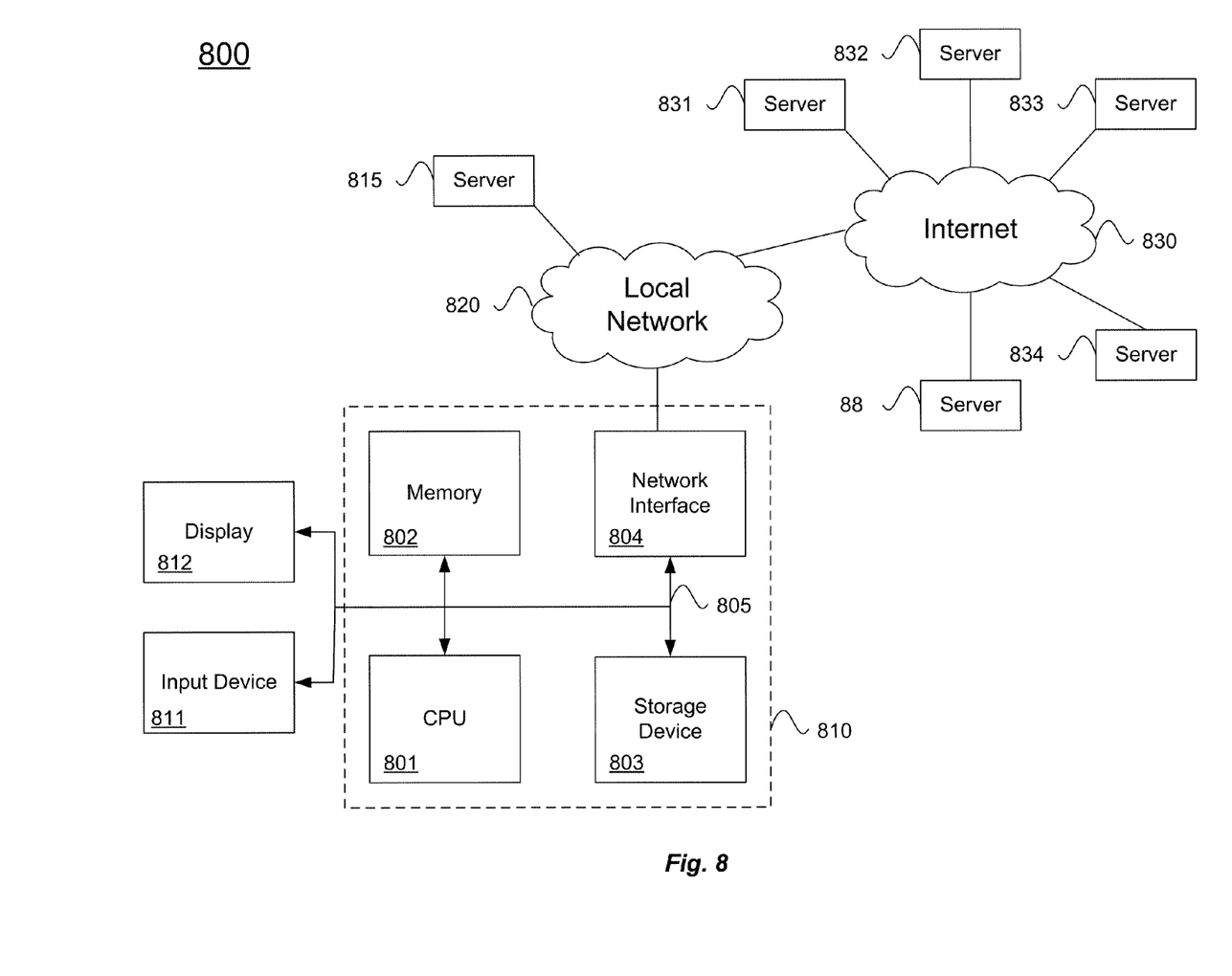
FIG. 8 illustrates a simplified schematic of a computer system that can be used to implement various embodiments the present invention.

FIG. 8 illustrates an example computer system and networks that may be used to implement embodiments of the present invention. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 810 may be coupled via the same or different information bus, such as bus 805, or network communication bus, to a display 812, such as a cathode ray tube (CRT) or liquid crystal display (LCD), projector, tablet computer, PDA, or smart phone for displaying information, such as the analysis digest section and for individual analysis digests. An input device 811 such as a keyboard and/or mouse is coupled to a bus for communicating information and command selections from the user to processor 801. The combination of these components allows the user to communicate with the system.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810 or servers 831 across the network. Software components described above may be implemented on one or more servers. A server 831 may transmit messages from one component, through Internet 830, local network 820, and network interface 804 to a component or container on computer system 810, for example. Software components of a composite application may be implemented on the same system as other components, or on a different machine than other software components. This process of sending and receiving information between software components or one or more containers may be applied to communication between computer system 810 and any of the servers 831 to 835 in either direction. It may also be applied to communication between any two servers 831 to 835.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:

loading, in a computer system comprising at least one processor, a multidimensional data set having a plurality of data fields;

retrieving, in the computer system, automatically without user intervention, an analysis digest specification associated with a particular user, wherein:

the analysis digest specification includes a plurality of specifications for discrete analysis digests, each of the plurality of specifications specifies:

one or more definitions for a particular analysis results, wherein the one or more definitions specify a predetermined subset of data fields, in the plurality of data fields, customized by a first user, and a visual representation of the particular analysis results;

parsing, in the computer system, the multidimensional data set according to the analysis digest specification to generate a first parsed multidimensional data set;

generating, in the computer system, a first plurality of analysis digests in response to the first parsed multidimensional data set and the analysis digest specification;

determining, in the computer system, that a third user is associated with the particular user;

retrieving, in the computer system, automatically without user intervention, another analysis digest specification associated with the third user that is different than the analysis digest specification associated with the particular user;

generating, in the computer system, an additional analysis digest in response to the first parsed multidimensional data set and the another analysis digest specification, wherein the additional analysis digest is different than the plurality of analysis digests; and assigning the first plurality of analysis digests and the additional analysis digest to a second user by causing the first plurality of analysis digests and the additional analysis digest to be automatically displayed to the second user, wherein the first user is associated with a first business role, and the second user is associated with a second business role different from the first business role.

2. The method of claim 1 wherein the one or more definitions for the visual representation comprise definitions for size and location for displaying the first plurality of analysis digests to the first user.

3. The method of claim 1 wherein the one or more definitions for the particular analysis results comprise an association with an associated user.

4. The method of claim 3 further comprising retrieving an analysis digest specification associated with the associated user;

parsing, in the computer system, the multidimensional data set according to the analysis digest specification associated with the associated user to generate a second parsed multidimensional data set; and generating, in the computer system, a second plurality of analysis digests in response to the second parsed multidimensional data set and the analysis digest specification associated with the associated user.

5. The method of claim 1 further comprising loading, in the computer system, the first plurality of analysis digests into a structured user interface according to the analysis digest specification.

6. The method of claim 1 further comprising receiving a user input through a control embedded in a structured user interface and updating one or more of the analysis digest in response to the user input.

7. The method of claim 6 further comprising displaying the structured user interface on a computer display device of the computer system, wherein each of the first plurality of analysis digests comprise graphical or alphanumeric visual representations corresponding to at least one of the plurality of specifications.

8. The method of claim 1, wherein the first plurality of analysis digests is assigned to the second user in accordance with an organizational structural relationship between the first user and the second user.

9. The method of claim 1 is executed in an enterprise resource planning (ERP) application.

10. The method of claim 1, wherein the multidimensional data set includes enterprise data.

11. The method of claim 1, further comprising: causing to be displayed in a same dashboard window, a plurality of graphical representations of the first parsed multidimensional data set, wherein the plurality of graphical representations includes:

a first graphical representation of the first parsed multidimensional data set, and a second graphical representation of the first parsed multidimensional data set different from the first graphical representation.

12. A system comprising:

one or more processors;

memory; and one or more programs, wherein the one or more programs are stored in the memory and are configured to be executed by the one or more processors, the one or more programs including instructions for running:

an analytic engine;

an analysis digest specification module coupled to the analytic engine; and a user profile module coupled to the analytic engine and the analysis digest module, wherein the analytic engine:

loads a multidimensional data set having a plurality of data fields, retrieves, automatically without user intervention, an analysis digest specification associated with a particular user from the analysis digest specification module, wherein the analysis digest specification includes a plurality of specifications for discrete analysis digests, each of the plurality of specifications specifies:

one or more definitions for a particular analysis results, wherein the one or more definitions specify a predetermined subset of data fields, in the plurality of data fields, customized by a first user, and a visual representation of the particular analysis results, parses the multidimensional data set according to the analysis digest specification to generate a first parsed multidimensional data set;

generates a first plurality of analysis digests in response to the first parsed multidimensional data set and the analysis digest specification;

determines that a third user is associated with the particular user;

retrieves, automatically without user intervention, another analysis digest specification associated with the third user that is different than the analysis digest specification associated with the particular user;

generates an additional analysis digest in response to the first parsed multidimensional data set and the another analysis digest specification, wherein the additional analysis digest is different than the plurality of analysis digests; and assigns the first plurality of analysis digests and the additional analysis digest to a second user by causing the first plurality of analysis digests and the additional analysis digest to be automatically displayed to the second user, wherein the first user is associated with a first business role, and the second user is associated with a second business role different from the first business role.

13. The system of claim 12 wherein the one or more definitions for the visual representation comprise definitions for size and location for displaying the first plurality of analysis digests to the first user.

14. The system of claim 12 wherein the one or more definitions for the particular analysis results comprise an association with an associated user.

15. The system of claim 14 wherein the analytic engine further retrieves an analysis digest specification associated with the associated user, parses the multidimensional data set according to the analysis digest specification associated with the associated user to generate a second parsed multidimensional data set, and generates a second plurality of analysis digests in response to the second parsed multidimensional data set and the analysis digest specification associated with the associated user.

16. The system of claim 12 wherein the analytic engine further loads the first plurality of analysis digests into a structured user interface according to the analysis digest specification.

17. The system of claim 12 wherein the analytic engine further receives a user input through a control embedded in a structured user interface and updates one or more of the analysis digest in response to the user input.

18. The system of claim 17 wherein the analytic engine further displays the structured user interface on a computer display device, wherein each of the first plurality of analysis digests comprise graphical or alphanumeric visual representations corresponding to at least one of the plurality of specifications.

19. A non-transient computer readable medium comprising: executable code that when executed by a processor of a computer system cause the processer to:

load a multidimensional data set having a plurality of data fields into a memory of the computer system, retrieve, automatically without user intervention, an analysis digest specification associated with a particular user, wherein: the analysis digest specification includes a plurality of specifications for discrete analysis digests, each of the plurality of specifications specifies:

one or more definitions for a particular analysis results, wherein the one or more definitions specify a predetermined subset of data fields, in the plurality of data fields, customized by a first user, and a visual representation of the particular analysis results, parse the multidimensional data set according to the analysis digest specification to generate a first parsed multidimensional data set, generates a first plurality of analysis digests in response to the first parsed multidimensional data set and the analysis digest specification, determines that a third user is associated with the particular user, retrieves, automatically without user intervention, another analysis digest specification associated with the third user that is different than the analysis digest specification associated with the particular user, generates, an additional analysis digest in response to the first parsed multidimensional data set and the another analysis digest specification, wherein the additional analysis digest is different than the plurality of analysis digests, and assigns the first plurality of analysis digests and the additional analysis digest to a second user by causing the first plurality of analysis digests and the additional analysis digest to be automatically displayed to the second user, wherein the first user is associated with a first business role, and the second user is associated with a second business role different from the first business role.

20. The non-transient computer readable medium of claim 19 wherein the one or more definitions for the particular analysis results comprise an association with an associated user.

21. The non-transient computer readable medium of claim 20 further comprising executable code that causes the processor to retrieve an analysis digest specification associated with the associated user, parse the multidimensional data set according to the analysis digest specification associated with the associated user to generate a second parsed multidimensional data set, and generate a second plurality of analysis digests in response to the second parsed multidimensional data set and the analysis digest specification associated with the associated user.

22. The non-transient computer readable medium of claim 19 further executable code that causes the processor to load the first plurality of analysis digests into a structured user interface according to the analysis digest specification.

23. The non-transient computer readable medium of claim 19 further comprising executable code that causes the processor to receive a user input through a control embedded in a structured user interface and updating one or more of the analysis digest in response to the user input.

24. The non-transient computer readable medium of claim 23 further comprising executable code that causes the processor to display the structured user interface on a computer display device, wherein each of the first plurality of analysis digests comprise graphical or alphanumeric visual representations corresponding to at least one of the plurality of specifications.

* * * * *